(No Model.)

H. P. CHRISTIE.
FRICTION CLUTCH.

No. 462,623. Patented Nov. 3, 1891.

Witnesses:
E. A. Brandau
W. D. Bent, Jr.

Inventor:
Henry P. Christie
By his atty
John Richards

UNITED STATES PATENT OFFICE.

HENRY P. CHRISTIE, OF SAN FRANCISCO, CALIFORNIA.

FRICTION-CLUTCH.

SPECIFICATION forming part of Letters Patent No. 462,623, dated November 3, 1891.

Application filed March 23, 1891. Serial No. 386,055. (No model.)

*To all whom it may concern:*

Be it known that I, HENRY P. CHRISTIE, a citizen of the United States, and a resident of the city and county of San Francisco, and State of California, have invented certain new and useful Improvements in Friction-Clutches; and I hereby declare the following description and drawings to be a full and exact specification of the same.

My invention relates to that class of clutch mechanism wherein wheels or pulleys are engaged and disengaged by means of frictional contact, and to a means for supporting and maintaining in alignment such pulleys and wheels when they are not in motion or use, without any running joints or bearings, when the frictional surfaces are disengaged; also, to increasing the area of such surfaces and balancing the strains thereon.

The invention consist in providing at both sides of pulleys or wheels annular supports or bearings the diameter of which is great enough to permit the friction-clutch mechanism to pass through the bearings and to operate therein, the wheels or pulleys having no support on, and consequently no connection with, the driving or driven shaft, except through the medium of the friction-clutch when that is engaged.

It also consists in providing the wheels or pulleys with rims or extensions at their sides projecting beyond their faces, so as to form an axial bearing or support when the wheels or pulleys are not in use, such support being, as before said, independent of the driving or driven shaft to which the friction-clutch is applied.

It consists also in the construction, arrangement, and combination of the several parts, substantially as will be hereinafter described and claimed.

Figure 1:
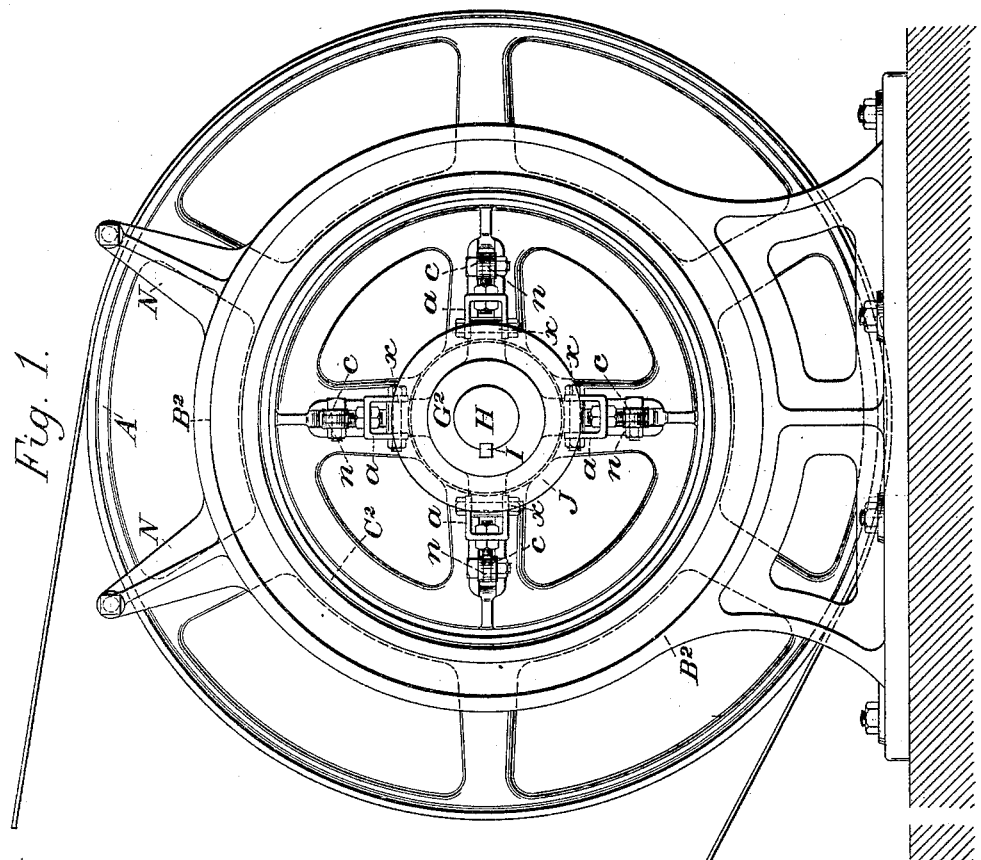
Figure 2:
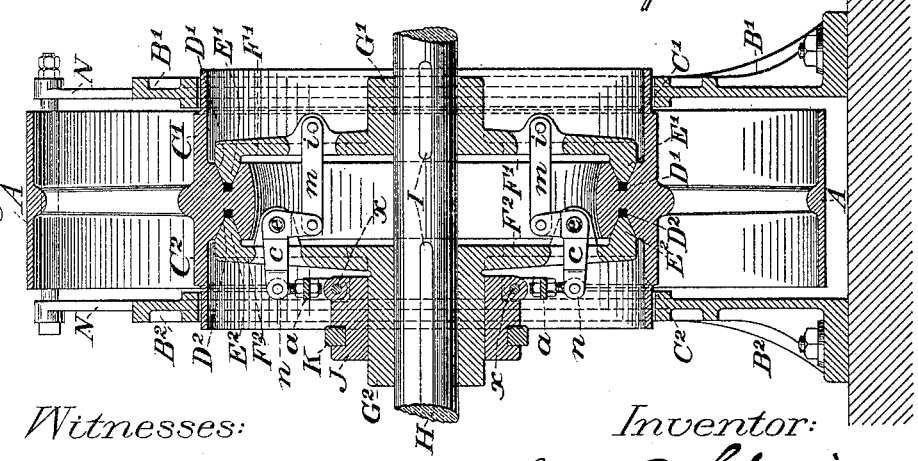

Referring to the drawings, in which similar letters of reference indicate corresponding parts, Figure 1 is a side view of one of my improved clutches applied to a band-pulley, and Fig. 2 is a section through Fig. 1 on its central axis or plane of the driving-shaft.

The pulley A is mounted and sustained when not in use on two strong brackets $B'$ and $B^2$ by means of the flanges or rings $C'$ and $C^2$, which are turned so as to fit loosely in the brackets $B'$ and $B^2$, forming an axial support. These brackets $B'$ and $B^2$ are bolted firmly at their base, as shown, and are also connected by struts and bolts at N, so they are held rigid and parallel.

Within the flanges or rings $C'$ and $C^2$ and attached to the spokes of the pulley A are angularly-grooved ledges $D'$ and $D^2$, into which fit correspondingly-angular rims $E'$ and $E^2$, formed on the inner faces of the plates $F'$ and $F^2$ of the friction-clutch. These plates $F'$ and $F^2$ are formed integrally with the bosses or hubs $G'$ and $G^2$, which fit loosely on the shaft H, and are prevented from turning thereon by means of the keys or feathers I.

To engage the rims or faces $E'$ and $E^2$, the plates $F'$ and $F^2$ are drawn together in the following manner: On the boss $G^2$ is placed a sliding sleeve or collar J, in which there is a groove and a loose ring K, Fig. 2. To this ring can be attached a lever or other mechanism to slide the sleeve or collar J on the boss $G^2$. As this sleeve or collar J is moved out or in the adjustable struts $a$ press outward or draw inward the horizontal arm $n$ of the bell-cranks $c$, which have their fulcrums at $e$ on the plate $F^2$. This causes a corresponding strain on the links $m$, which are attached to the plate $F'$ at $i$, as shown in Fig. 2. In this manner the angular faces on each side are caused to grip with equal force, opposing each other, and there are no other strains set up except in the toggle-gearing composed of the members $a$, $c$, and $m$ and their connections. Supposing the pulley A to be at rest, as soon as the clutch is put into the position shown in Fig. 2 the angular faces at $E'$ and $E^2$ grip the pulley A, and it begins to revolve the shaft H, receives its weight and also the strain of the band, and centers the pulley A on the shaft, leaving the brackets entirely clear of same. When the collar or sleeve J is moved out on the boss $G^2$, the adjustable struts $a$, pivoted at $x$, are shortened by their angular position, and the two plates $F'$ and $F^2$ are forced apart by means of the bell-crank $c$ and link $m$ disengaging the angular faces of the clutch, permitting the pulley A to stop and take its bearing in the brackets $B'$ and $B^2$, as at first described.

The amount of pressure or the drivingpower of the clutch is regulated by means of the nuts on the strut $a$, which permit adjustment as to length, as shown in Fig. 1. In this manner it will be seen that when the pulley A is stopped there is no running contact in the mechanism anywhere except the collar K, employed to move the sleeve or collar J, and this having no strain upon it there is no wear and no lubrication required, as in the case when the pulley A is mounted with its bearing on the shaft. It may also be noticed that the strains throughout are controlled and balanced in respect to all moving pieces. It will also be understood that the sustaining-brackets B' and B² can stand on a floor or foundation, as shown in the drawings, or can be fastened to a ceiling or wall, as the requirements may be, their position around the axis not affecting in any way the operation of the clutch.

The mechanism shown and the method of its operation is applicable to wheels, pulleys, or sheaves. A band-pulley is selected in the present case as the most familiar application. The same mechanism is also applicable to either a driven or driving pulley, except that in the first case when the pulley A revolves on the brackets B' and B² when out of use the bearing areas C' and C² are made larger and more carefully fitted.

I do not confine my invention to the exact form of the angular friction-faces. These may be modified to suit the amount of strain or work, and in cases where the strain is light radial faces can be employed without changing the nature and objects of my invention.

Having thus described the nature and objects of my invention, also the method of constructing and applying the same, what I claim as new, and desire to secure by Letters Patent, is—

1. In a friction-clutch, the combination of a pulley A, having collars or rings C' and C², and the stationary brackets B' and B², arranged with bearings to receive and support said pulley around an independent driving-shaft, so that when the clutch is disengaged the pulley will come to rest and be sustained out of running contact, substantially as described.

2. In a friction-clutch, a pulley A, having bearing collars or rings C' and C² mounted and running loosely in the stationary brackets B' and B², in connection with a central driving-shaft H, and double clutch members placed inside the brackets B' and B², substantially in the manner and for the purposes specified.

3. In a friction-clutch, the brackets B' and B², and a pulley A, mounted loosely thereon and provided with friction-grooves at each side, as shown, so the pulley when disengaged will take its bearing on the brackets B' and B² independent of the driving-shaft in the center, substantially as herein shown and described.

4. In a friction-clutch, the combination of the pulley A, having collars or rings C' and C² and provided at both sides with friction-grooves, the plates F' and F², having jaws E' and E² engaging said grooves, said plates being integral with hubs G' and G², the main shaft H, having keys or feathers which prevent the said hub from turning, and the toggle mechanism, whereby the plates F' and F² are operated, substantially as described.

5. In a friction-clutch, the combination of the pulley A, having supporting rings or sleeves C' and C², which give axial support when the wheel or pulley is not in use, and having likewise frictional surfaces, the friction-plates F' and F², and toggle mechanism for operating said plates so as to grip the pulley, substantially as described.

6. In a friction-clutch, the combination of a pulley A, the plates F' and F², the toggle-gearing, and the stationary brackets B' and B², said brackets being arranged with bearings to receive and support the pulley, so that when the clutch is disengaged the pulley may come to rest and be sustained out of running contact.

7. In a friction-pulley, the two movable gripping-plates F' and F², provided with jaws E' and E² facing each other and at each side of the driven pulley A, the bell-crank $c$, link $m$, and adjustable strut $a$, the whole combined and operating substantially in the manner and for the purposes as set forth and described.

8. In a friction-clutch, the combination of a pulley A, having flanges or rings C' and C², within which are arranged the oppositely-located angular-grooved ledges D' and D², the plates F' and F², formed integral with the hubs G' and G² and having on their inner faces the angular rims E' and E², which fit into the ledges D' and D², and the toggle mechanism, consisting of the levers, arranged substantially as described.

In testimony whereof I have hereunto affixed my signature in the presence of two witnesses.

HENRY P. CHRISTIE.

Witnesses:
ALFRED A. ENQUIST,
W. D. BENT, Jr.